United States Patent
Mattsson et al.

(10) Patent No.: US 11,267,330 B2
(45) Date of Patent: Mar. 8, 2022

(54) HYBRID SYSTEM FOR A VEHICLE AND VEHICLE COMPRISING THE SAME

(71) Applicant: Volvo Construction Equipment AB, Eskilstuna (SE)

(72) Inventors: Per Mattsson, Sölvesborg (SE); Mathias Lehikoinen, Västerås (SE)

(73) Assignee: Volvo Construction Equipment AB, Eskilstuna (SE)

( * ) Notice: Subject to any disclaimer, the term of this patent is extended or adjusted under 35 U.S.C. 154(b) by 0 days.

(21) Appl. No.: 17/251,156

(22) PCT Filed: Jun. 13, 2018

(86) PCT No.: PCT/EP2018/065677
§ 371 (c)(1),
(2) Date: Dec. 10, 2020

(87) PCT Pub. No.: WO2019/238225
PCT Pub. Date: Dec. 19, 2019

(65) Prior Publication Data
US 2021/0252963 A1  Aug. 19, 2021

(51) Int. Cl.
*B60K 6/365* (2007.10)
*B60K 6/26* (2007.10)
(Continued)

(52) U.S. Cl.
CPC .............. *B60K 6/365* (2013.01); *B60K 6/26* (2013.01); *B60K 6/28* (2013.01); *F16H 3/66* (2013.01);
(Continued)

(58) Field of Classification Search
None
See application file for complete search history.

(56) References Cited

U.S. PATENT DOCUMENTS

| | | | |
|---|---|---|---|
| 7,179,185 B2 * | 2/2007 | Raghavan | F16H 3/728 475/5 |
| 7,217,211 B2 * | 5/2007 | Klemen | B60W 10/26 475/5 |

(Continued)

FOREIGN PATENT DOCUMENTS

| | | |
|---|---|---|
| DE | 102013209565 A1 | 11/2014 |
| DE | 202015004910 A1 | 8/2015 |

(Continued)

OTHER PUBLICATIONS

International Search Report and Written Opinion of the International Searching Authority, PCT/EP2018/065677, dated Feb. 12, 2019, 16 pages.

(Continued)

*Primary Examiner* — Dirk Wright
(74) *Attorney, Agent, or Firm* — Sage Patent Group

(57) ABSTRACT

A hybrid system for a vehicle including a hybrid machine and a transmission arrangement that includes a first, a second and a third planetary gear set each including a sun gear, a planet carrier and a ring gear, the transmission arrangement further including five shift elements engageable in combinations of two to obtain six forward gear stages, wherein the ring gear of the first planetary gear set and the planet carrier of the second planetary gear set are operatively connected to each other, the ring gear of the second planetary gear set and the planet carrier of the third planetary gear set are operatively connected to each other, two planetary members of the third planetary gear set are selectively connectable to each other by a single one of the shift elements, wherein the hybrid machine and the ring gear of the first planetary gear set are connected to each other.

22 Claims, 2 Drawing Sheets

(51) Int. Cl.
  *B60K 6/28* (2007.10)
  *F16H 3/66* (2006.01)

(52) U.S. Cl.
  CPC ..... *B60Y 2200/415* (2013.01); *B60Y 2200/92* (2013.01); *F16H 2200/0052* (2013.01); *F16H 2200/201* (2013.01); *F16H 2200/2012* (2013.01); *F16H 2200/2041* (2013.01)

(56) References Cited

U.S. PATENT DOCUMENTS

| | | | | |
|---|---|---|---|---|
| 7,261,657 | B2 * | 8/2007 | Bucknor | B60K 6/365 |
| | | | | 475/5 |
| 7,347,798 | B2 * | 3/2008 | Raghavan | F16H 3/728 |
| | | | | 475/5 |
| 7,387,586 | B2 * | 6/2008 | Raghavan | F16H 3/728 |
| | | | | 475/5 |
| 7,393,298 | B2 * | 7/2008 | Bucknor | B60K 6/365 |
| | | | | 475/5 |
| 7,491,144 | B2 * | 2/2009 | Conlon | B60W 10/08 |
| | | | | 475/5 |
| 7,500,930 | B2 * | 3/2009 | Raghavan | F16H 3/728 |
| | | | | 475/5 |
| 10,543,740 | B2 * | 1/2020 | Oh | B60K 6/547 |
| 11,041,546 | B2 * | 6/2021 | Mattsson | F16H 3/64 |
| 2002/0183160 | A1 | 12/2002 | Kao et al. | |
| 2006/0068970 | A1 | 3/2006 | Rose | |
| 2006/0122025 | A1 | 6/2006 | Hayabuchi et al. | |
| 2007/0187167 | A1 | 8/2007 | Mariani et al. | |
| 2009/0105036 | A1 | 4/2009 | Herold et al. | |
| 2010/0307881 | A1 | 12/2010 | Detrick et al. | |
| 2016/0115672 | A1 | 4/2016 | Heybroek et al. | |

FOREIGN PATENT DOCUMENTS

| | | | | |
|---|---|---|---|---|
| DE | 102014218622 A1 * | 3/2016 | | F16H 3/66 |
| DE | 102014218625 A1 * | 3/2016 | | B60K 6/48 |
| DE | 102015204570 A1 * | 9/2016 | | B60K 6/547 |
| DE | 102015204578 A1 * | 9/2016 | | F16H 3/666 |
| DE | 102015204581 A1 * | 9/2016 | | B60K 6/365 |
| DE | 102016201855 A1 * | 8/2017 | | F16H 3/66 |
| WO | 2005028926 A1 | 3/2005 | | |
| WO | WO-2016091522 A1 * | 6/2016 | | B60K 6/365 |
| WO | 2017010919 A1 | 1/2017 | | |
| WO | WO-2019025413 A1 * | 2/2019 | | B60K 6/48 |

OTHER PUBLICATIONS

Belz, Thomas, selected sections of "Varianten von Mehrgang-Planetengetrieben," Mar. 8, 2016, 23 pages (including English translation).

\* cited by examiner

_US 11,267,330 B2_

HYBRID SYSTEM FOR A VEHICLE AND VEHICLE COMPRISING THE SAME

CROSS REFERENCE TO RELATED APPLICATIONS

This application is a 35 U.S.C. § 371 national stage application of PCT International Application No. PCT/EP2018/065677 filed on Jun. 13, 2018, the disclosure and content of which is incorporated by reference herein in its entirety.

TECHNICAL FIELD

The present invention relates to a hybrid system for a vehicle. The invention also relates to a vehicle comprising such a hybrid system. The invention is applicable on vehicles, in particularly working machines such as e.g. wheel loaders, although other types of working machines are conceivable.

BACKGROUND

In connection with transportation of heavy loads at construction sites or the like, a working machine is often used. The working machines may be utilized for transportations in connection with road or tunnel building, sand pits, mines, forestry and similar environments. Thus, the working machine is frequently operated with large and heavy loads in rough terrain and on slippery ground where no regular roads are present.

There is a demand from the market to be able to propel the working machine in a more environmentally friendly manner, for example by hybridization of the driveline of the working machine. Such a driveline may consist of a prime mover, a gearbox and a hybrid machine, such as e.g. a hydraulic machine, which may be used solely or in combination with the propulsive power from the prime mover. The hybrid machine is connected to the gearbox such that several gears are provided from the hybrid machine to the wheels, although not necessarily as many as from the prime mover to the wheels. The number of gears as well as gear ratios and steps have to be optimized for the specific hybrid machine which is used. With an optimized gearbox, the hybrid machine will operate in its most efficient range and the desired combination of rim pull and top speed can be reached with a limited size of the hybrid machine.

The gearbox comprises a transmission arrangement and depending on the specific type of gearbox, the transmission arrangement may comprise e.g. ordinary gear sets with cylindrical gear wheels in meshed connection with each other or planetary gear sets comprising a respective sun gear, ring gear and a planet carrier, or a transmission having a combination of ordinary gear sets and one or more planetary gear sets. Such a transmission arrangement may be combined with the hybrid machine to get a hybrid system.

There is hence a desire to be able to hybridize operation of a working machine as an alternative to conventional propulsion from a prime mover.

SUMMARY

It is an object of the present invention to provide a hybrid system which at least partially overcomes the deficiencies of the prior art. The object is at least partly achieved by a hybrid system according to claim 1.

According to a first aspect of the present invention, there is provided a hybrid system for a vehicle, the hybrid system comprising a hybrid machine and a transmission arrangement, wherein the transmission arrangement comprises a transmission housing, an input shaft, and an output shaft, the transmission arrangement further comprising a first, a second and a third planetary gear set each comprising a first, a second and a third planetary member, the planetary members being a sun gear, a planet carrier and a ring gear, the transmission arrangement further comprising five shift elements engageable in combinations of two to obtain six forward gear stages, wherein the ring gear of the first planetary gear set and the planet carrier of the second planetary gear set are operatively connected to each other, the ring gear of the second planetary gear set and the planet carrier of the third planetary gear set are operatively connected to each other, two planetary members of the third planetary gear set are selectively connectable to each other by a single one of the shift elements, and wherein the hybrid machine and the ring gear of the first planetary gear set are connected to each other.

The wording "operatively connected to" should in the following and throughout the entire description be interpreted such that the components thereof are fixedly connected to each other, i.e. the rotational speed of the components which are operatively connected to each other is the same. Hence, no connecting mechanism or the like is arranged between the components that are operatively connected to each other and they can therefore not be disengaged from one another during operation. Accordingly, the ring gear of the first planetary gear set is always connected to the planet carrier of the second planetary gear set.

Moreover, the wording "selectively connectable to" should in the following and throughout the entire description be interpreted as an element being connectable at desirable points in time to another element. Hereby, gear shifts of the transmission arrangement can be executed by either connecting or disconnecting elements to/from each other. Components may be selectively connectable to each other by means of connecting/locking mechanisms and controlled by e.g. a control unit or the like. When a connecting/locking mechanism is positioned in an engaged state the components are connected to each other.

The wording "connected to" should be construed such that the hybrid machine is connected to the ring gear of the first planetary gear set, either directly, i.e. operatively connected, or indirectly. The hybrid machine may be indirectly connected to the ring gear of the first planetary gear set via e.g. a clutch or a gear stage, which may be an ordinary gear set or a planetary gear set.

Moreover, the hybrid machine should be construed as a machine which is able to propel the working machine, either alone or in combination with a prime mover, such as an internal combustion engine. The hybrid machine may also be arranged together with an energy storage device to accumulate and store energy during operation. The hybrid machine may preferably be a hydraulic machine. Such hydraulic machine may thus be arranged to operate as a hydraulic motor when propelling the working machine, and operate as a hydraulic pump for regeneration of energy when the driving conditions for doing so are beneficial. As will be described further below, the hydraulic machine may be arranged in fluid communication with an energy storage device in the form of a hydraulic accumulator. The hybrid machine may however instead be an electric machine. Such electric machine may be arranged to operate as an electric motor when propelling the working machine, and arranged as an electric generator connected to e.g. a battery for accumulation of energy when the driving conditions for doing so are beneficial.

An advantage is that the vehicle may be operated with a hybrid system, thus being propelled in a more environmentally friendly manner. The inventors of the present disclosure have realized that the specific transmission arrangement can be advantageously used in combination with a hybrid machine to form an environmental friendly hybrid system. By connecting the hybrid machine to the ring gear of the first planetary gear set, various gear ratios to the output shaft are obtainable, which can be advantageous for various load cycles of the working machine and prevent over-speeding of the hybrid machine at high vehicle speeds. Another advantage is that the reversing of travel direction will be smoother with the hybrid system and also with less wear of the brakes.

According to an example embodiment, the hybrid system may further comprise an additional transmission arrangement operatively connected to the output shaft of the transmission arrangement.

According to an example embodiment, the additional transmission arrangement may comprise a first gear wheel operatively connected to the output shaft and a second gear wheel arranged in meshed connection with the first gear wheel for guiding the torque from the transmission arrangement to a vertically lower position in comparison to the output shaft.

An advantage is that a difference in elevation between the input shaft and the output shaft of the gearbox can be obtained, which makes the gearbox suitable for e.g. a wheel loader.

According to an example embodiment, the output shaft may be operatively connected to the planet carrier of the first planetary gear set.

According to an example embodiment, the input shaft may be connected to the sun gear of the third planetary gear set.

The wording "connected to" should be construed such that the input shaft is connected to the sun gear of the third planetary gear set, either directly, i.e. operatively connected, or indirectly. The input shaft may be indirectly connected to the sun gear of the third planetary gear set via e.g. a clutch, via a gear stage or, as will be described below, via a fourth planetary gear set.

According to an example embodiment, the transmission arrangement may further comprise a fourth planetary gear set comprising a sun gear, a planet carrier and a ring gear, the fourth planetary gear set being operatively connected between the input shaft and the sun gear of the third planetary gear set.

The fourth planetary gear set is formed by similar structure as the first, second and third planetary gear sets of the transmission arrangement. The planetary gear sets may preferably be arranged in a co-axial manner. The interconnection between the fourth planetary gear set and the third planetary gear set can thus be relatively simple to implement.

According to an example embodiment, the input shaft may be operatively connected to the sun gear of the fourth planetary gear set.

According to an example embodiment, the input shaft may be selectively connectable to the planet carrier of the fourth planetary gear set.

According to an example embodiment, the ring gear of the fourth planetary gear set may be selectively connectable to the transmission housing.

According to an example embodiment, the planet carrier of the fourth planetary gear set may be operatively connected to the sun gear of the third planetary gear set.

Hereby, and especially in the case of double planet gears in the fourth planetary gear set, forward/reverse gear functionality may be obtained from the fourth planetary gear set.

According to an example embodiment, the sun gear and the ring gear of the third planetary gear set may be selectively connectable to each other. Hereby, power can be transferred from the input shaft to the ring gear of the second planetary gear set via the planet carrier of the third planetary gear set without power recirculation in the third planetary gear set.

According to an example embodiment, the sun gear and the planet carrier of the third planetary gear set may be selectively connectable to each other. Hereby, power can be transferred from the input shaft to the ring gear of the second planetary gear set via the planet carrier of the third planetary gear set by by-passing the third planetary gear set.

According to an example embodiment, the five shift elements may comprise two locking mechanisms and three connecting mechanisms.

A locking mechanism should be construed as a shift element which e.g. locks a planetary member of one of the planetary gear sets to the transmission housing. Hence, when a locking mechanism is positioned in the engaged state, the planetary member connected thereto is held stationary. A connecting mechanism on the other hand should be construed as a shift element which e.g. connects two planetary members to each other, or connects a planetary member to the input shaft or the output shaft of the transmission arrangement. Hereby, the members on a respective side of the connecting mechanism rotate with the same rotational speed when the connecting mechanism is positioned in the engaged state. The locking mechanisms and the connecting mechanisms may also be positioned in a slipping state, whereby a relative rotational speed is obtained between the members connected thereto.

According to an example embodiment, the sun gear of the first planetary gear set and the sun gear of the second planetary gear set may be operatively connected to each other.

According to an example embodiment, the sun gear of the first planetary gear set and the transmission housing may be selectively connectable to each other.

According to an example embodiment, the sun gear of the second planetary gear set and the transmission housing may be selectively connectable to each other.

According to an example embodiment, the planet carrier of the second planetary gear set and the ring gear of the third planetary gear set may be selectively connectable to each other.

According to an example embodiment, the ring gear of the third planetary gear set and the transmission housing may be selectively connectable to each other.

According to an example embodiment, the sun gear of the third planetary gear set and the planet carrier of the second planetary gear set may be selectively connectable to each other.

According to an example embodiment, the hybrid machine may be operatively connected to an energy storage device. Hereby, the hybrid machine is supplied with power for propelling the working machine via the transmission arrangement. The hybrid machine may also be arranged to regenerate power to the energy storage device when the vehicle is operated in a power regenerating mode, such as when driving downhill, etc.

According to an example embodiment, the hybrid machine may be one of a hydraulic machine and an electric machine. The hydraulic machine may for example be a variable displacement machine. The hydraulic machine should preferably be operable in forward and rearward driving direction, i.e. be able to supply or receive flow of hydraulic fluid in both flow directions, either by using an over center hydraulic machine or by use of e.g. a suitable valve arrangement.

According to a second aspect of the present invention, there is provided a vehicle comprising a prime mover and a driveline connected to the prime mover, wherein the driveline comprises a hybrid system according to any one of the example embodiments described above in relation to the first aspect.

Effects and features of the second aspect are largely analogous to those described above in relation to the first aspect.

Further features of, and advantages with, the present invention will become apparent when studying the appended claims and the following description. The skilled person realize that different features of the present invention may be combined to create embodiments other than those described in the following, without departing from the scope of the present invention.

DEFINITIONS

The relationship between the rotational speeds of the different members in a planetary gear set is defined according to the following:

$$\frac{\omega_S - \omega_P}{\omega_R - \omega_P} = R \quad \text{(Eq. 1)}$$

wherein
$\omega_S$ is the speed of rotation of the sun gear;
$\omega_P$ is the speed of rotation of the planet carrier;
$\omega_R$ is the speed of rotation of the ring gear; and
R is the stationary gear ratio of the planetary gear set.

As used herein, the expression "stationary gear ratio" R for a planetary gear set is defined as the ratio of the speed of rotation of the sun gear to the speed of rotation of the ring gear in a situation in which the planet carrier is stationary, i.e.:

$$R = -\frac{z_R}{z_S} \text{ for single planet gear wheels} \quad \text{(Eq. 2)}$$

and $$R = +\frac{z_R}{z_S} \text{ for double planet gear wheels} \quad \text{(Eq. 3)}$$

wherein
$z_R$ is the number of teeth of the ring gear; and
$z_S$ is the number of teeth of the sun gear.

In a similar manner, the expression "ratio" for a transmission should be understood to relate to the number of revolutions of the input shaft of the transmission divided by the number of revolutions of the output shaft of the transmission. Furthermore, the expression "step" should be understood to mean the quotient achieved when the ratio of a gear is divided by the ratio of an adjacent gear of a transmission.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

DETAILED DESCRIPTION OF EXAMPLE EMBODIMENTS OF THE INVENTION

Figure 1:
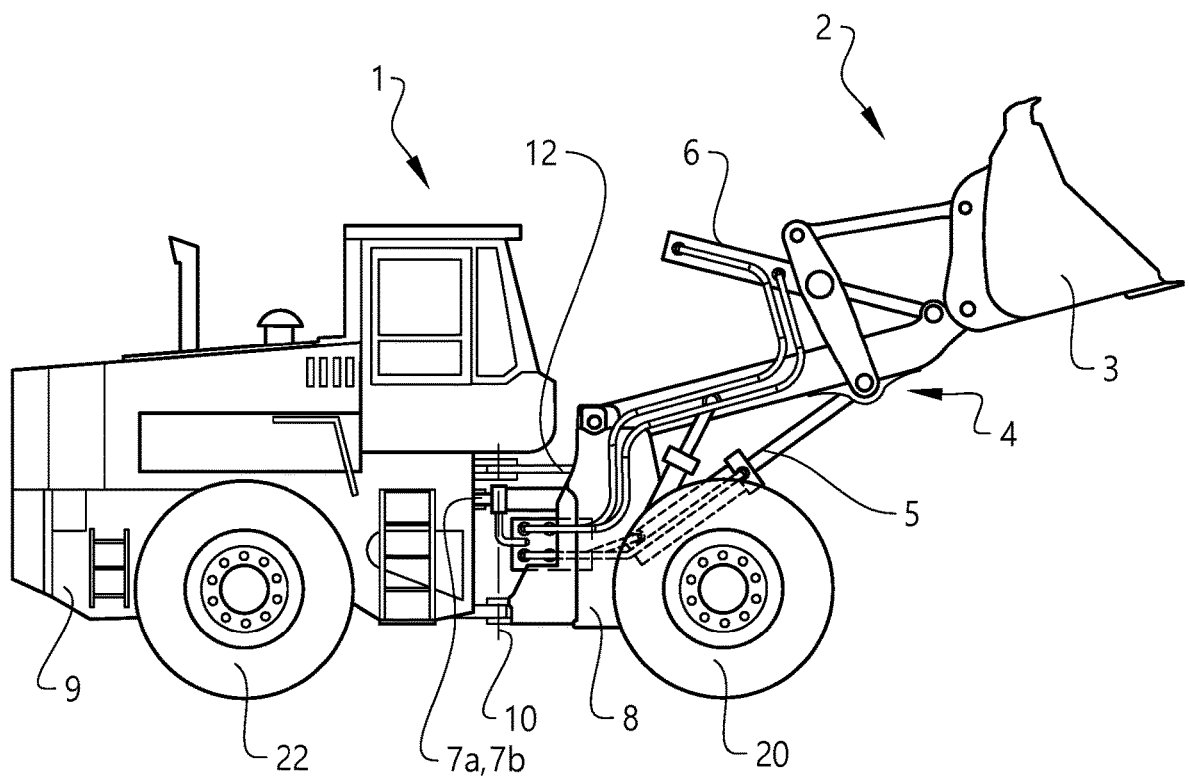
FIG. 1 is a lateral side view illustrating a working machine in the form of a wheel loader.

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference character refer to like elements throughout the description.

FIG. 1 is a lateral side view illustrating an example embodiment of a working machine in the form of a loader vehicle 1 having an implement 2 for loading operations. The loader vehicle 1 depicted in FIG. 1 is in the form of an articulated wheel loader. The term "implement" is intended to comprise any kind of hydraulically operated tool, such as a bucket, a fork or a gripping tool arranged on the loader vehicle 1. The implement 2 illustrated in FIG. 1 comprises a bucket 3 which is arranged on a loading unit assembly 4 for lifting and lowering the bucket 3. The bucket 3 can also be tilted or pivoted relative to the loading unit assembly 4. The loader vehicle 1 is provided with a hydraulic system comprising at least one hydraulic machine (not shown), such as e.g. a hydraulic pump. The loader vehicle 1 further comprises a hydraulic lift cylinder 5, for lifting operation of the loading unit assembly 4 and a hydraulic tilt cylinder 6 for tilting the bucket 3 relative to the loading unit assembly 4. Furthermore, the hydraulic system comprises steering cylinders 7a, 7b for turning the loader vehicle 1 by means of relative movement of a front unit 8 and a rear unit 9 around a substantially vertical geometric axis 10 of an articulated joint arrangement 12. The front unit 8 and the rear unit 9 comprise a respective pair of ground engaging members 20, 22. The ground engaging members 20, 22 are in the example embodiment a respective pair of wheels. In other words, the loader vehicle 1 is frame-steered by means of the steering cylinders 7a, 7b.

Figure 2:
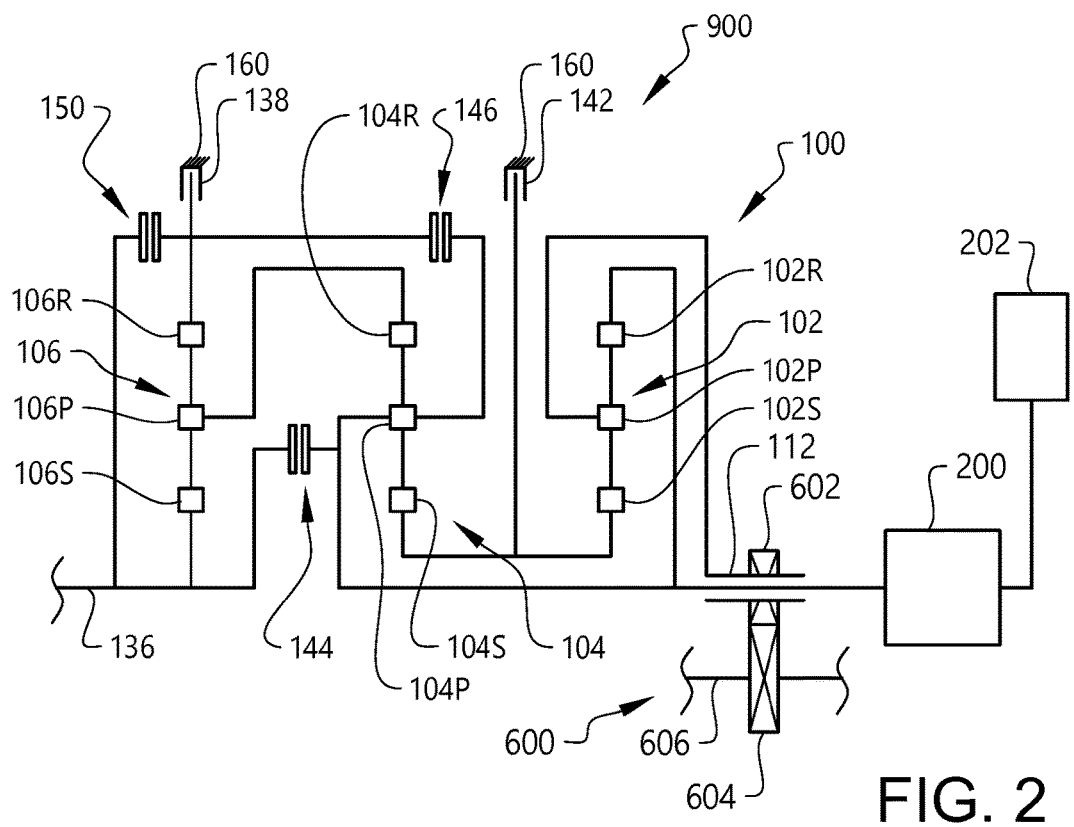
FIG. 2 schematically illustrates a hybrid system according to an example embodiment of the present invention.

Turning now to FIG. 2, which schematically illustrates a hybrid system 100 according to an example embodiment which is suitable for the above described loader vehicle 1. The hybrid system 100 comprises a transmission arrangement 900 which is arranged to obtain forward gear stages as will be described further below. The transmission arrangement 900 comprises a first planetary gear set 102 comprising a sun gear 102S, a planet carrier 102P and a ring gear 102R, a second planetary gear set 104 comprising a sun gear 104S, a planet carrier 104P and a ring gear 104R, and a third planetary gear set 106 comprising a sun gear 106S, a planet carrier 106P and a ring gear 106R. The transmission arrangement 900 further comprises an input shaft 136 for receiving a rotary motion/torque from the prime mover (not shown) of the loader vehicle 1 and an output shaft 112 for providing a rotary motion/torque to the driven wheels of the loader vehicle 1. The output shaft 112 is in turn operatively connected to an additional transmission arrangement 600.

The additional transmission arrangement 600, which may also be referred to as a drop box, comprises a first 602 and a second 604 gear wheel arranged in meshed connection with each other. The second gear wheel 604 is arranged on a transmission shaft 606. The transmission shaft 606 may be directly or indirectly connected to the wheels of the working machine. By means of the drop box, the torque from the transmission arrangement 900 can be directed to a vertically lower position. Although FIG. 2 only illustrates a single pair of gear wheels, the additional transmission arrangement 600 may comprise a plurality of gear wheels arranged in meshed connection with each other.

The hybrid system 100 further comprises a hybrid machine 200. The hybrid machine 200 is preferably a hydraulic machine 200 which can be arranged to operate as a hydraulic motor for propelling the working machine, or as a hydraulic pump for generating hydraulic power. The hybrid machine 200 is operatively connected to the ring gear 102R of the first planetary gear set 102 and to the planet carrier 104P of the second planetary gear set 104. Hereby, the hybrid machine can provide propulsive power to the transmission arrangement 900 and further to the output shaft 112 of the transmission arrangement.

According to the example embodiment depicted in FIG. 2, the hybrid system 100 comprises an energy storage device 202 connected to the hybrid machine 200. Depending on the driving situation, the energy storage device 202 is arranged to either receive power from the hybrid machine 200, or to supply power to the hybrid machine 200. If the hybrid machine is a hydraulic machine, the energy storage device 202 is preferably a hydraulic accumulator.

The different members of the planetary gear sets 102, 104, 106 of the transmission arrangement 900, i.e. the sun gear, the planet carrier and the ring gear, are in the example embodiment depicted in FIG. 2 configured according to the following. It should be readily understood that the different members described below are connected to each other, either directly, i.e. operatively connected, or via a connecting mechanism, i.e. selectively connectable. The members can be operatively connected to each other by means of e.g. a connector element. Such connector element can be e.g. a solid shaft, a hollow shaft or a drum, or other suitable element for connecting two members to each other, which elements are known to the person skilled in the art. Hence, no explicit explanation is given below in regards to the means connecting the members to each other.

The planet carrier 102P of the first planetary gear set 102 is operatively connected to the output shaft 112 of the transmission arrangement 900, i.e. the planet carrier 102P is at all times directly connected to the output shaft 112 of the transmission arrangement 900. Further, the ring gear 102R of the first planetary gear set 102 is operatively connected to the planet carrier 104P of the second planetary gear set 104. The ring gear 102R of the first planetary gear set 102 is also selectively connectable to the sun gear 106S of the third planetary gear set 106 as well as the input shaft 136 of the transmission arrangement 900 by means of a second connecting mechanism 144. The sun gear 102S of the first planetary gear set 102 is operatively connected to the sun gear 104S of the second planetary gear set 104. Furthermore, the sun gear 102S of the first planetary gear set 102 and the sun gear 104S of the second planetary gear set 104 are selectively connectable to a transmission housing 160 of the transmission arrangement 900 by means of a first locking mechanism 142. Hence, the first locking mechanism 142, when being engaged, initially reduces the rotational speed of the respective sun gears 102S, 104S, and thereafter locks the respective sun gears 102S, 104S to the transmission housing 160.

The ring gear 104R of the second planetary gear set 104 is operatively connected to the planet carrier 106P of the third planetary gear set 106. Furthermore, the planet carrier 104P of the second planetary gear set 104 is also selectively connectable to the ring gear 106R of the third planetary gear set 106 by means of a first connecting mechanism 146.

The sun gear 106S of the third planetary gear set 106 is operatively connected to the input shaft 136. The ring gear 106R of the third planetary gear set 106 is selectively connectable to the transmission housing 160 by means of a second locking mechanism 138. Hence, the second locking mechanism 138, when being engaged, initially reduces the rotational speed of the ring gear 106R, and thereafter locks the ring gear 106R to the transmission housing 160. Furthermore, the input shaft 136 is selectively connectable to the ring gear 106R of the third planetary gear set 106 by means of a third connecting mechanism 150. Accordingly, the sun gear 106S and the ring gear 106R of the third planetary gear set 106 are selectively connectable to each other by means of the third connecting mechanism 150.

It should be readily understood that the third connecting mechanism 150 may equally as well be positioned between the sun gear 106S and the planet carrier 106P of the third planetary gear set 106, as well as between the planet carrier 106P and the ring gear 106R of the third planetary gear set 106. This is valid also for the embodiment described below in relation to FIG. 3.

According to the example depicted in FIG. 2, the transmission arrangement 900 is adapted to assume the gears as presented in Table 1 below. In Table 1 below, as well as for the remaining tables of the present disclosure, the locking mechanisms are denoted simply as "Brakes" while the connecting mechanisms are denoted simply as "Clutches". A cell marked with a dot indicates an engaged state and a blank cell indicates a disengaged state. The tables also indicate non-limiting examples of the gear ratios and steps obtainable by the transmission arrangement 900 for the various gears. According to a non-limiting example valid for all tables below, the stationary gear ratio for the first planetary gear set 102 may be −2.871, the stationary gear ratio for the second planetary gear set 104 may be −1.754, and the stationary gear ratio for the third planetary gear set 106 may be −1.737.

TABLE 1

Shift diagram for the different forward gears of the embodiment in FIG. 2.

| | Brakes | | Clutches | | | | |
|---|---|---|---|---|---|---|---|
| Gear | 138 | 142 | 150 | 144 | 146 | Ratio | Step |
| F1 | ● | ● | | | | 5.794 | 1.678 |
| F2 | | ● | | | ● | 3.452 | 1.631 |
| F3 | | ● | ● | | | 2.117 | 1.570 |
| F4 | | ● | | | ● | 1.348 | 1.348 |
| F5 | | | | ● | ● | 1.000 | 1.287 |
| F6 | ● | | | | ● | 0.777 | |

As can be seen in Table 1, the transmission arrangement 900 in FIG. 2 comprises six forward gear stages F1-F6, wherein each of the six gear stages is obtained by positioning two of the shift elements in the engaged state. The switching of gears can preferably be executed by one-step gear shifts or with two-step gear shifts. One-step gear shift should be understood to mean that a gear shift is executed from one gear to the next coming consecutive gear, for example, gear shift from the first gear stage to the second gear stage, from the second gear stage to the third gear stage, from the third gear stage to the second gear stage, etc. Two-step gear shift should be understood to mean that a gear shift is executed to exclude a next coming consecutive gear stage, for example, gear shift from the first gear stage to the third gear stage, from the second gear stage to the fourth gear stage, from the third gear stage to the first gear stage, etc.

As can be seen from Table 1, one-step gear shifting includes only single shifts of the connecting mechanisms and the locking mechanisms, i.e. when executing one-step gear shifts, only one of the connecting mechanisms/locking mechanisms is shifted from an engaged state to a disengaged state, and only one of the connecting mechanisms/locking mechanisms is shifted from a disengaged state to an engaged state. As an example, when shifting from the first gear stage to the second gear stage, it is only the second locking mechanism 138 that is changed from an engaged state to a disengaged state, and only the first connecting mechanism 146 that is changed from a disengaged state to an engaged state. Likewise, also two-step gear shifting only includes single shifts of the connecting mechanisms and the locking mechanisms.

An advantage of the transmission arrangement is hence that the shiftability is improved since a low number of connecting mechanisms/locking mechanisms need activation/deactivation during gear shifting. In detail, during both one-step gear shifting as well as during two-step gear shifting, only single shifts occur.

Furthermore, the hybrid machine 200 is in FIG. 2 operatively connected to the ring gear 102R of the first planetary gear set 102 and to the planet carrier 104P of the second planetary gear set 104. Hereby, three different gear ratios to the output shaft 112 are obtainable for the hybrid machine 200, as presented in the exemplifying Table 2 below. For gears F1-F4, the first locking mechanism 142 is engaged and the sun gear 102S of the first planetary gear set 102 is held stationary. Hence, the hybrid machine 200 will have a fixed gear ratio to the output shaft 112 for gears F1-F4. For gears F4-F6, the second connecting mechanism 144 is engaged and the hybrid machine 200 is directly connected to the input shaft 136 and to the prime mover. Hence the hybrid machine 200 will have the same gear ratios to the output shaft 112 as the prime mover for gears F4-F6. Hereby, the risk of over-speeding the rotational speed of the hybrid machine 200 is reduced.

TABLE 2

Shift diagram for the different forward gears of the embodiment in FIG. 2.

| | Brakes | | Clutches | | | Prime mover ratio | Hybrid machine ratio |
|---|---|---|---|---|---|---|---|
| Gear | 138 | 142 | 150 | 144 | 146 | | |
| F1 | ● | ● | | | | 5.794 | 1.348 |
| F2 | | ● | | | ● | 3.452 | 1.348 |
| F3 | | ● | ● | | | 2.117 | 1.348 |
| F4 | | ● | | ● | | 1.348 | 1.348 |
| F5 | | | ● | ● | | 1.000 | 1.000 |
| F6 | ● | | ● | | | 0.777 | 0.777 |

Figure 3:
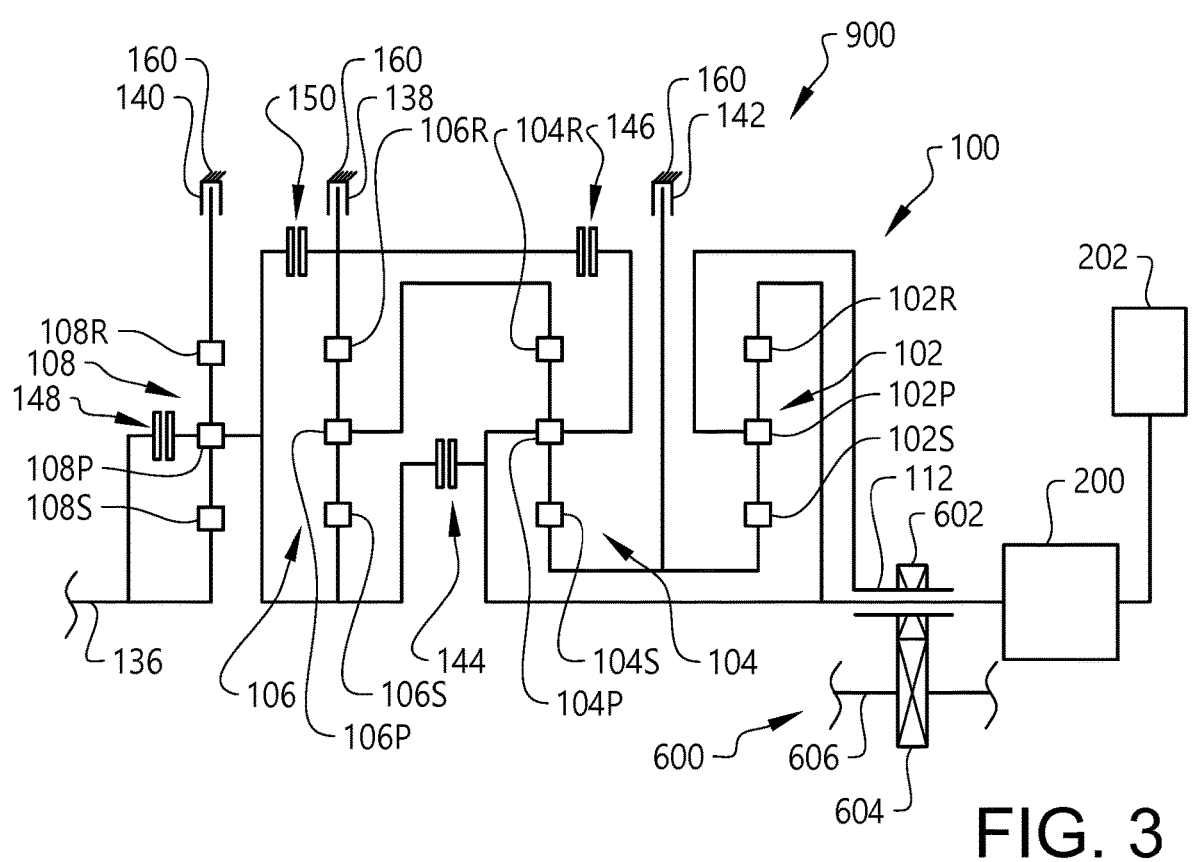
FIG. 3 schematically illustrates a hybrid system according to another example embodiment of the present invention.

As described above, the transmission arrangement 900 assumes forward gear stages. Reference is therefore made to FIG. 3 for description of a fourth planetary gear set 108 operatively connected between the input shaft 136 and the third planetary gear set 106 for also obtaining reverse gear stages. The fourth planetary gear set 108 comprises a sun gear 108S, a planet carrier 108P and a ring gear 108R. The planet carrier 108P supports a number of planet gears, as for the other planet carriers 102P, 104P and 106P (not shown). Here, a set of double planet gears are preferably used, resulting in a positive stationary gear ratio for the fourth planetary gear set 108. The transmission arrangement 900 also comprises a further shift element 140 in the form of a third locking mechanism 140, and an additional shift element 148 in the form of a fourth connecting mechanism 148.

As can be seen in FIG. 3, the sun gear 108S of the fourth planetary gear set 108 is operatively connected to the input shaft 136. The planet carrier 108P is selectively connectable to the input shaft 136 by means of the fourth connecting mechanism 148. The planet carrier 108P of the fourth planetary gear set 108 is also operatively connected to the sun gear 106S of the third planetary gear set 106. Finally, the ring gear 108R of the fourth planetary gear set 108 is selectively connectable to the transmission housing 160 by means of the third locking mechanism 140. Hence, the third locking mechanism 140, when being engaged, initially reduces the rotational speed of the ring gear 108R, and thereafter locks the ring gear 108R to the transmission housing 160.

The hybrid system 100 in FIG. 3 is adapted to assume the gear stages as presented in Tables 3 and 4 below. The ratios and steps presented in Tables 3 and 4 should be seen as non-limiting examples.

TABLE 3

Shift diagram for the different forward gears of the embodiment in FIG. 3.

| | Brakes | | | Clutches | | | | | |
|---|---|---|---|---|---|---|---|---|---|
| Gear | 138 | 140 | 142 | 148 | 150 | 144 | 146 | Ratio | Step |
| F1 | ● | | ● | ● | | | | 5.794 | 1.678 |
| F2 | | | ● | ● | | | ● | 3.452 | 1.631 |
| F3 | | | ● | ● | ● | | | 2.117 | 1.570 |
| F4 | | | ● | ● | | ● | | 1.348 | 1.348 |
| F5 | | | | ● | ● | ● | | 1.000 | 1.287 |
| F6 | ● | | | ● | | ● | | 0.777 | |

TABLE 4

Shift diagram for the different reverse gears of the embodiment in FIG. 3.

| | Brakes | | | Clutches | | | | | |
|---|---|---|---|---|---|---|---|---|---|
| Gear | 138 | 140 | 142 | 148 | 150 | 144 | 146 | Ratio | Step |
| R1 | ● | ● | ● | | | | | -5.794 | 1.678 |
| R2 | | ● | ● | | | | ● | -3.452 | 1.631 |
| R3 | | ● | ● | | ● | | | -2.117 | 1.570 |
| R4 | | ● | ● | | | ● | | -1.348 | 1.348 |
| R5 | | ● | | | ● | ● | | -1.000 | 1.287 |
| R6 | ● | ● | | | | ● | | -0.777 | |

As can be seen in Tables 3 and 4, the transmission arrangement 900 depicted in FIG. 3 assumes six forward gear stages F1-F6 and six reverse gear stages R1-R6. According to the non-limiting example depicted in Table 3, the ratios and steps for the forward gears F1-F6 are similar to those depicted in Table 1 above. This is due to the fact that the third locking mechanism 140 is positioned in the disengaged state and the fourth connecting mechanism 148 is positioned in the engaged state for each of the forward gear stages, resulting in a 1:1 gear ratio over the fourth planetary gear set 108.

Moreover, the third locking mechanism 140 is positioned in the engaged state and the fourth connecting mechanism 148 is positioned in the disengaged state for each of the reverse gear stages R1-R6. The fourth planetary gear set 108 is thus arranged for achieving the reverse gear stages R1-R6. As a non-limiting example, the stationary gear ratio for the fourth planetary gear set 108 may be chosen to +2, resulting in a 1:−1 gear ratio over the fourth planetary gear set 108. The absolute value of the ratios for the reverse gear stages R1-R6 will then be the same as for the forward gear stages F1-F6.

With regards to one-step gear shifting and two-step gear shifting, the same arguments as given in relation to the description of FIG. 2 and Table 1 are also valid for the embodiment depicted in FIG. 3 and Tables 3 and 4. Moreover, the description of the hybrid machine 200 given above in relation to the description of FIG. 2 is also valid for the embodiment depicted in FIG. 3.

It is to be understood that the present invention is not limited to the embodiments described above and illustrated in the drawings; rather, the skilled person will recognize that many changes and modifications may be made within the scope of the appended claims. For example, although the present invention has mainly been described in relation to a wheel loader, the invention should be understood to be equally applicable for any type of vehicle.

The invention claimed is:

1. A hybrid system for a vehicle, the hybrid system comprising a hybrid machine and a transmission arrangement, wherein the transmission arrangement comprises a transmission housing, an input shaft, and an output shaft, the transmission arrangement further comprising a first, a second and a third planetary gear set each comprising a first, a second and a third planetary member, said planetary members being a sun gear, a planet carrier and a ring gear, the transmission arrangement further comprising five shift elements engageable in combinations of two to obtain six forward gear stages, wherein the ring gear of the first planetary gear set and the planet carrier of the second planetary gear set are operatively connected to each other, the ring gear of the second planetary gear set and the planet carrier of the third planetary gear set are operatively connected to each other, two planetary members of the third planetary gear set are selectively connectable to each other by a single one of the shift elements, and wherein the hybrid machine and the ring gear of the first planetary gear set are connected to each other.

2. The hybrid system according to claim 1, further comprising an additional transmission arrangement operatively connected to the output shaft of the transmission arrangement.

3. The hybrid system according to claim 2, wherein the additional transmission arrangement comprises a first gear wheel operatively connected to the output shaft and a second gear wheel arranged in meshed connection with the first gear wheel for guiding the torque from the transmission arrangement to a vertically lower position in comparison to the output shaft.

4. The hybrid system according to claim 1, wherein the output shaft is operatively connected to the planet carrier of the first planetary gear set.

5. The hybrid system according to claim 1, wherein the input shaft is connected to the sun gear of the third planetary gear set.

6. The hybrid system according to claim 5, wherein the transmission arrangement further comprises a fourth planetary gear set comprising a sun gear, a planet carrier and a ring gear, the fourth planetary gear set being operatively connected between the input shaft and the sun gear of the third planetary gear set.

7. The hybrid system according to claim 6, wherein the input shaft is operatively connected to the sun gear of the fourth planetary gear set.

8. The hybrid system according to claim 6, wherein the input shaft is selectively connectable to the planet carrier of the fourth planetary gear set.

9. The hybrid system according to claim 6, wherein the ring gear of the fourth planetary gear set is selectively connectable to the transmission housing.

10. The hybrid system according to claim 6, wherein the planet carrier of the fourth planetary gear set is operatively connected to the sun gear of the third planetary gear set.

11. The hybrid system according to claim 1, wherein the sun gear and the ring gear of the third planetary gear set are selectively connectable to each other.

12. The hybrid system according to claim 1, wherein the sun gear and the planet carrier of the third planetary gear set are selectively connectable to each other.

13. The hybrid system according to claim 1, wherein the five shift elements comprise two locking mechanisms and three connecting mechanisms.

14. The hybrid system according to claim 1, wherein the sun gear of the first planetary gear set and the sun gear of the second planetary gear set are operatively connected to each other.

15. The hybrid system according to claim 1, wherein the sun gear of the first planetary gear set and the transmission housing are selectively connectable to each other.

16. The hybrid system according to claim 1, wherein the sun gear of the second planetary gear set and the transmission housing are selectively connectable to each other.

17. The hybrid system according to claim 1, wherein the planet carrier of the second planetary gear set and the ring gear of the third planetary gear set are selectively connectable to each other.

18. The hybrid system according to claim 1, wherein the ring gear of the third planetary gear set and the transmission housing are selectively connectable to each other.

19. The hybrid system according to claim 1, wherein the sun gear of the third planetary gear set and the planet carrier of the second planetary gear set are selectively connectable to each other.

20. The hybrid system according to claim 1, wherein the hybrid machine is operatively connected to an energy storage device.

21. The hybrid system according to claim 1, wherein the hybrid machine is one of a hydraulic machine and an electric machine.

22. A vehicle comprising a prime mover and a driveline connected to the prime mover, wherein the driveline comprises a hybrid system according to claim 1.

* * * * *